INVENTOR.
Clifford H. Wurtz
BY Edwin S. Dyfuig
HIS ATTORNEY

July 11, 1961 C. H. WURTZ 2,991,630
REFRIGERATING APPARATUS WITH DEFROST CONTROLS
Filed Dec. 19, 1958 2 Sheets-Sheet 2

INVENTOR.
Clifford H. Wurtz
BY Edwin S. Dybvig
HIS ATTORNEY

United States Patent Office 2,991,630
Patented July 11, 1961

2,991,630
REFRIGERATING APPARATUS WITH DEFROST CONTROLS
Clifford H. Wurtz, Dayton, Ohio, assignor to General Motors Corporation, Detroit, Mich., a corporation of Delaware
Filed Dec. 19, 1958, Ser. No. 781,611
3 Claims. (Cl. 62—156)

This invention relates to refrigerating apparatus and more particularly to a household refrigerator having a refrigerated food storage compartment and a frozen food storage compartment.

It is an object of this invention to provide a low-cost self-defrosting household refrigerator wherein a single evaporator serves to cool both the main food storage compartment as well as the frozen food storage compartment.

More particularly it is an object of this invention to provide a multiple-compartment refrigerator wherein the one side of the evaporator serves to refrigerate the relatively high temperature compartment and the other side of the evaporator serves to refrigerate the frozen food storage compartment, the arrangement of the evaporator and the proportions of the parts being such that heat from the relatively warm air in the main food storage compartment serves to defrost the evaporator during each off cycle.

Further objects and advantages of the present invention will be apparent from the following description, reference being had to the accompanying drawings, wherein a preferred form of the present invention is clearly shown.

Figure 1:
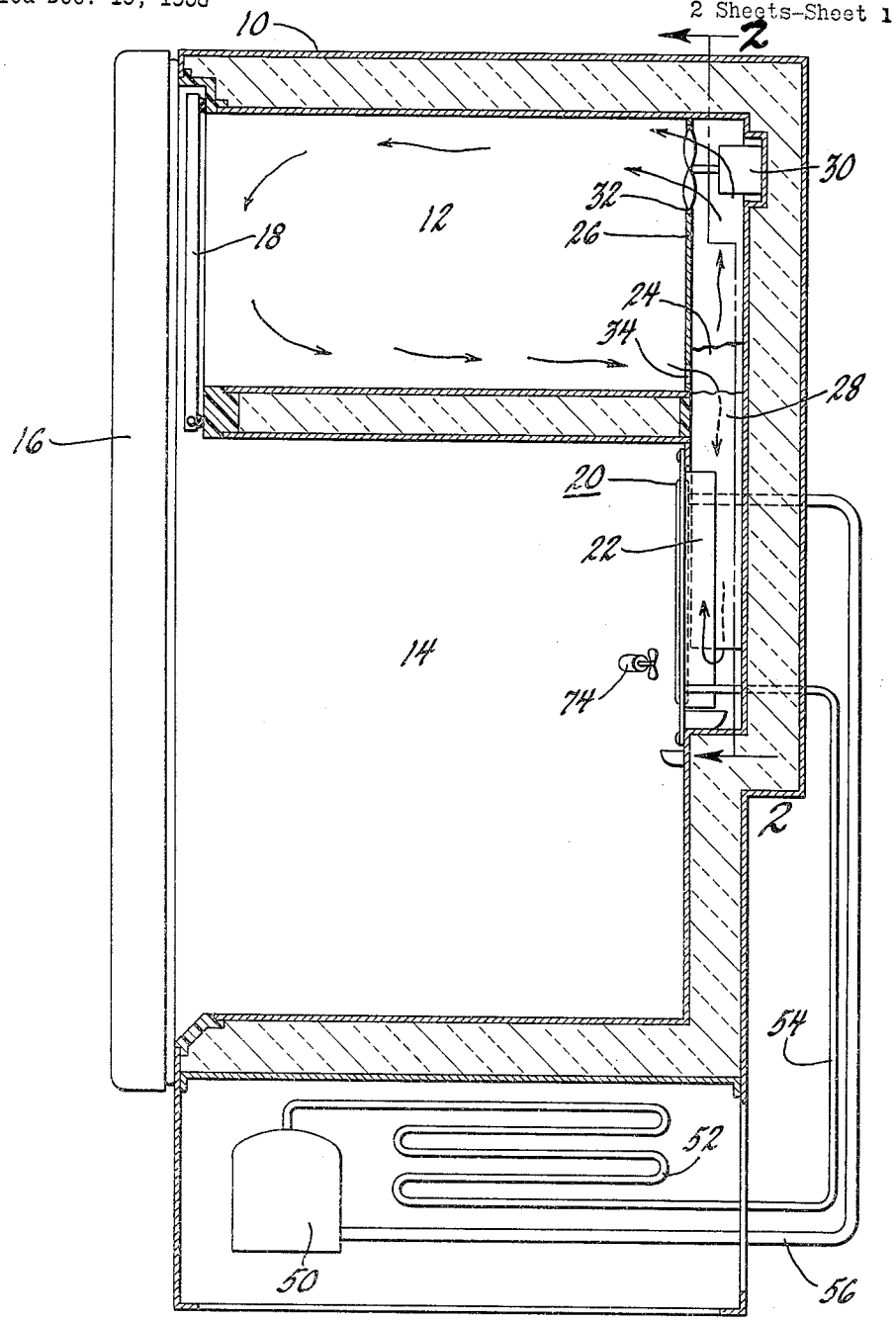
FIGURE 1 is a vertical sectional view, partly schematic, showing a preferred form of the invention.
Figure 2:
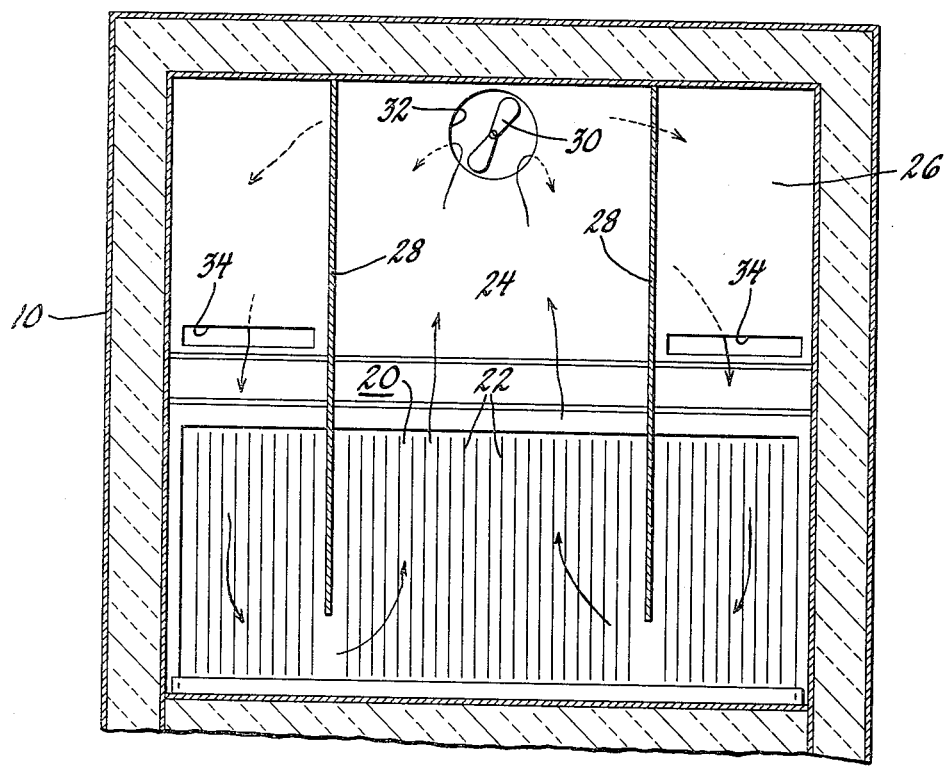
FIGURE 2 is a fragmentary sectional view taken substantially on line 2—2 of FIGURE 1 showing the air flow.

Referring now to the drawing wherein a preferred embodiment of the invention has been shown, reference numeral 10 designates an insulated cabinet having a frozen food storage compartment 12 in the upper portion thereof and a conventional food storage compartment 14 wherein unfrozen foods may be maintained under refrigeration in the lower portion thereof. The usual outer access door 16 and inner door 18 are provided which serve to close the food storage compartments in accordance with conventional practice.

The compartments 12 and 14 are both cooled by means of a single evaporator 20 which is arranged with its front side exposed to the air in the relatively high temperature food storage compartment 14 so as to cool the air in the compartment 14. The rear side of the evaporator 20 serves to cool air for the freezer compartment and is provided with a plurality of fins 22 which are arranged within an air duct 24 disposed behind the evaporator 20. The duct 24 extends upwardly behind the rear wall 26 of the frozen food storage compartment 12 as shown. The air duct is provided with a pair of air inlet openings 34, an air outlet opening 32 and suitable baffles 28 which direct the air to be refrigerated for the frozen food storage compartment into thermal exchange relationship with the rear side of the evaporator 20 and the fins 22 secured to the evaporator 20. A fan 30 is provided as shown and serves to discharge the refrigerated air flowing in thermal exchange with the evaporator 20 into the upper portion of the frozen food storage compartment through the air outlet 32 provided adjacent the upper rear corner of the compartment 12. A corresponding amount of air returns to the duct through the air return openings 34 which are provided adjacent the lower rear corners of the compartment 12. The path of the air flow through the duct 24 and the compartment 12 has been indicated by arrows.

Figure 3:
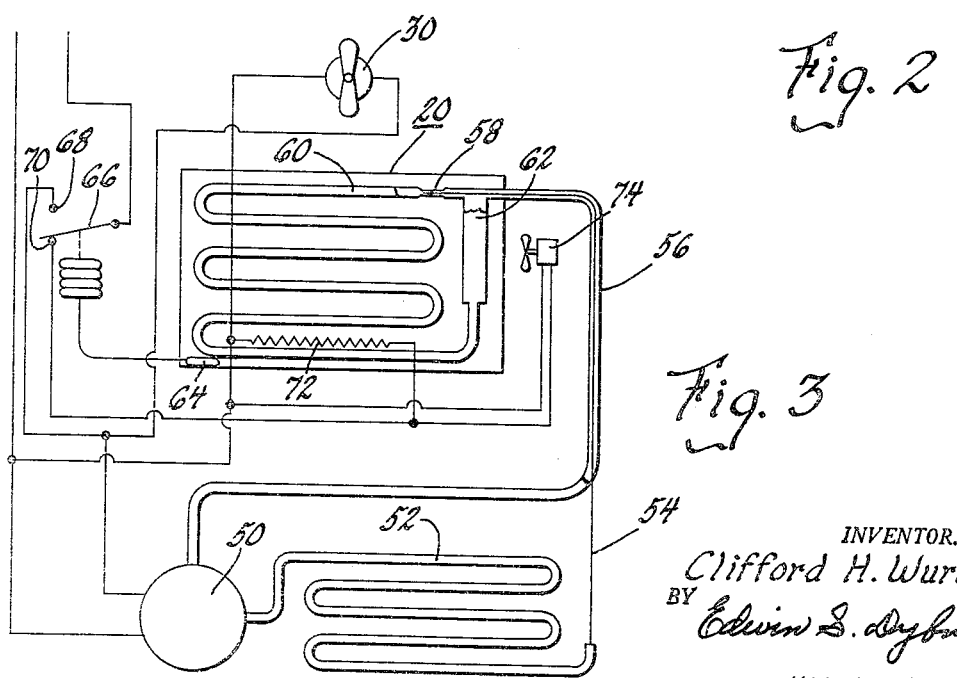
FIGURE 3 is a schematic view showing the refrigerant circuit and the electrical controls.

The evaporator 22 is adapted to be supplied with liquid refrigerant by means of a conventional refrigerant liquefying system including a sealed motor-compressor unit 50 which discharges compressed refrigerant into a condenser 52 wherein the refrigerant is liquefied and then fed into the evaporator 20 through a capillary tube type restrictor 54. As schematically shown in FIGURE 3, a portion of the capillary tube restrictor 54 is arranged to extend into the suction line 56 through which the refrigerant returns to the motor-compressor unit 50. It will be noted that the capillary tube 54 passes through a narrow neck portion 58 in the refrigerant passage 60 formed in the plate evaporator 20. The restriction at the point 58 prevents the vaporized refrigerant from passing between the outer surface of the restrictor 56 and the inner walls of the passage 60 whereby all of the refrigerant fed to the evaporator passage 60 through the capillary tube 54 is required to travel the full length of the passage 60 and to discharge into the accumulator chamber 62 before entering the main suction line 56.

A thermostat 64 which is preferably located on that part of the evaporator 20 which normally defrosts the last serves to control a switch 66 arranged as shown. Whenever the temperature of the evaporator contacting bulb 64 exceeds a temperature of approximately 37° the switch 66 will move to engage the contact 68 whereby the motor-compressor unit 50 will be energized and will serve to supply liquid refrigerant to the evaporator 20. The thermostat 64 is designed to stop operation of the motor-compressor unit when the temperature of the evaporator 20 reaches a temperature of approximately −7°. When this occurs the switch element 66 engages the contact 70 so as to energize a small electric heater 72 arranged adjacent the lower edge of the evaporator for a purpose to be described hereinafter. Simultaneously with energization of the heater 72 a small fan 74 is energized and serves to forcefully circulate the relatively warm air from the compartment 14 into thermal exchange relationship with the evaporator 20 for the purpose of accelerating the defrosting of the evaporator 20. As shown in FIGURE 3 of the drawing the fan 30 which circulates air through the frozen food storage compartment 12 is arranged in parallel circuit relationship with the motor-compressor 50 whereby whenever the refrigerating system is in operation the fan 30 will operate, but when the motor-compressor unit 50 stops for the purpose of defrosting the evaporator 20 the fan 30 will stop.

By virtue of the above described structural arrangement the single evaporator may be used for refrigerating both the main food storage compartment 14 and the frozen food storage compartment 12 and it is possible to utilize the relatively warm air in the food storage compartment 14 for defrosting the evaporator 20 during each off cycle since the one side of the evaporator 20 is at all times exposed to the relatively warm air.

It will be noted that the arrangement of the capillary tube 54 is such that when the motor-compressor unit stops and the supply of condensed liquid refrigerant in the condenser is exhausted the relatively hot high pressure gas in the condenser 52 will flow into the upper end of the refrigerant passage 60 in the evaporator 20 so as to add heat to the evaporator and thereby materially accelerate the defrosting of the evaporator 20. Under suitable operating conditions it is possible to defrost the evaporator 20 during each off cycle merely by using the relatively warm air in the compartment 14 and the hot gas from the condenser for melting the frost on the evaporator 20. For purposes of illustration a small electric heater 72 has also been shown for applying a small amount of additional heat to the evaporator during the defrost cycle whereas this heater could be omitted under ideal operating conditions. Likewise, the fan 74 could be omitted if desired. It will be noted that the fan 74 operates only during the defrost part of the cycle and its primary purpose is to accelerate the defrosting of the evaporator and thereby reduce the length of time that the refrigerating system remains idle.

While the form of embodiment of the invention as herein disclosed constitutes a preferred form, it is to be understood that other forms might be adopted, as may come within the scope of the claims which follow.

What is claimed is as follows:

1. In a refrigerator having a frozen food storage compartment and an above freezing food storage compartment, means for refrigerating said compartments including an evaporator having its one side exposed to air in said above freezing food storage compartment, first means forcefully circulating air from said frozen food storage compartment into thermal exchange relationship with the other side of said evaporator, means controlling the operation of said evaporator so as to cycle the temperature thereof between a below freezing temperature and an above freezing temperature at which the frost thereon melts, and second means forcefully circulating air from said above freezing compartment into thermal exchange relationship with said evaporator during the frost melting portion of the cycle so as to accelerate the melting of frost thereon.

2. In a refrigerator having a frozen food storage compartment and an above freezing food storage compartment, means for refrigerating said compartments including an evaporator having its one side exposed to air in said above freezing food storage compartment, first means forcefully circulating air from said frozen food storage compartment into thermal exchange relationship with the other side of said evaporator, means controlling the operation of said evaporator so as to cycle the temperature thereof between a below freezing temperature and an above freezing temperature at which the frost thereon melts, second means forcefully circulating air from said above freezing compartment into thermal exchange relationship with said evaporator during the frost melting portion of the cycle so as to accelerate the melting of frost thereon, said evaporator controlling means comprising a thermostat responsive to the temperature of said evaporator, electric heater means adjacent said evaporator, and means for energizing said heater means during said frost melting portion of the cycle.

3. In a refrigerator, an insulated cabinet having a food storage compartment and an above freezing food storage compartment, said cabinet having a rearwardly extending offset portion in its upper rear wall, means for refrigerating said compartments including a vertically disposed plate type evaporator disposed adjacent the lower front of said offset portion and having its one side exposed to air in said relatively high temperature food storage compartment and forming a portion of the rear wall of said relatively high temperature food storage compartment, partition means spaced from the upper portion of said offset portion and forming the rear wall of said freezing compartment and having air inlet and air outlet openings communicating with said freezing compartment, means for forcefully circulating air from said freezing compartment through said openings and into thermal exchange relationship with the other side of said evaporator and through said frozen food storage compartment at a rate sufficient to sublimate frost in said frozen food storage compartment, and air directing baffles disposed in said offset portion for directing the flow of air from said freezing compartment over said evaporator.

References Cited in the file of this patent

UNITED STATES PATENTS

| | | |
|---|---|---|
| 2,130,036 | Shrader | Sept. 13, 1938 |
| 2,741,098 | Janos | Apr. 10, 1956 |
| 2,780,924 | Latter | Feb. 12, 1957 |
| 2,889,692 | McGrew | June 9, 1959 |